US009669747B2

(12) United States Patent
Turba

(10) Patent No.: US 9,669,747 B2
(45) Date of Patent: Jun. 6, 2017

(54) 360 AUTOVIEW PORTABLE TURNTABLE

(71) Applicant: Jerome K. Turba, De Pere, WI (US)

(72) Inventor: Jerome K. Turba, De Pere, WI (US)

(73) Assignee: 360 Autoview LLC, De Pere, WI (US)

( * ) Notice: Subject to any disclaimer, the term of this patent is extended or adjusted under 35 U.S.C. 154(b) by 253 days.

(21) Appl. No.: 14/536,687

(22) Filed: Nov. 10, 2014

(65) Prior Publication Data

US 2015/0158333 A1 Jun. 11, 2015

Related U.S. Application Data

(60) Provisional application No. 61/962,451, filed on Nov. 8, 2013.

(51) Int. Cl.
*B65G 67/38* (2006.01)
*B60P 1/00* (2006.01)
*B60S 13/02* (2006.01)
*B60P 3/32* (2006.01)

(52) U.S. Cl.
CPC ........ *B60P 1/00* (2013.01); *B60P 3/32* (2013.01); *B60S 13/02* (2013.01)

(58) Field of Classification Search
CPC ...... B60P 1/4407; B60P 1/4428; B60P 1/5461
USPC .... 104/44; 414/350, 362, 53, 541, 386, 469, 414/482, 577, 539; 410/1
See application file for complete search history.

(56) References Cited

U.S. PATENT DOCUMENTS

| | | | | |
|---|---|---|---|---|
| 1,449,767 A * | 3/1923 | MacLean | ........ | B60S 13/02 104/44 |
| 3,086,669 A * | 4/1963 | Rogers | ........ | B61D 3/20 104/41 |
| 3,490,389 A * | 1/1970 | Brown | ........ | B61D 3/04 104/35 |
| 5,086,704 A * | 2/1992 | Mueller | ........ | E04H 6/40 104/36 |
| 5,622,299 A * | 4/1997 | Berard | ........ | B60P 3/062 224/281 |
| 6,135,700 A * | 10/2000 | Collins | ........ | B60P 3/07 280/43.23 |
| 7,427,183 B2 * | 9/2008 | Stabeno | ........ | B60P 3/122 414/482 |
| 2003/0150657 A1 * | 8/2003 | Shupp | ........ | B60T 7/16 180/168 |

(Continued)

*Primary Examiner* — William Gilbert
(74) *Attorney, Agent, or Firm* — Leydig, Voit & Mayer, Ltd.

(57) ABSTRACT

A fast set-up and very portable turntable, able to rotate objects up to 7500 pounds at varying revolutions per minute. The modified "H" beam framework creates a low profile turntable with built-in loading and exiting ramp. Heavy duty casters riding on a large plate steel base, provide a smooth, stabile surface for the revolving casters. Proximity switches are used to create a synchronized system, which operate the hydraulic cylinders used for stability. They can also trigger a digital camera every few degrees of rotation, creating a 360 degree virtual reality image. The custom designed trailer carries the turntable on its underside with the use of an inverted four inch drop axle to gain ground clearance. Winches are used to lift the turntable from the ground. Inverted towers with casters at the four corners of the trailer offer protection to the turntable from irregular surfaces or curbs.

19 Claims, 9 Drawing Sheets

(56) References Cited

U.S. PATENT DOCUMENTS

2005/0173601 A1* 8/2005 Hestand ............... B60P 3/0255
                                              248/129
2015/0056049 A1* 2/2015 Honigsberg ............. B60P 3/07
                                              414/539

* cited by examiner

360 AUTOVIEW PORTABLE TURNTABLE

A mobile device used to rotate an object 360 degree, large or small, for display, video, or still image capture.

BACKGROUND OF THE INVENTION

Over the past years, 360 degree product photography has continued to grow and shows no sign of slowing. The shoe and jewelry industries, as examples, have successfully used 360 degree animation to sell their products. These animations consist of between 12 to 72 images of a 360 degree spin of an object on a small turntable. Larger objects could be sold using the same animation, but the problem is portability and function of such a large turntable. Large turntables currently may be built into a floor or set up with extensive material and labor, anything but portable. This device resolves all the issues facing such an endeavor.

SUMMARY

This turntable is transported location to location, suspended on the underside of a custom trailer. The total weight of the turntable and trailer is 4900 pounds, thereby allowing most SUVs, vans, or trucks to serve as the tow vehicle. The initial set-up of the turntable takes less than 30 minutes. The autoview portable turntable may (but is not limited to) be used simply as a display to revolve an object. That object may also be captured on video or still images. Built into the turntable is a triggering mechanism to capture any object in a 360 degree virtual reality when connected to a digital camera. The series of images taken can be compiled into one interactive 360 virtual reality digital file, using any of the several web programs found on the internet. One of many industries that would benefit from the use of this device is the motor vehicle market. There are over 62 million registered autos in the U.S. New auto manufacturers using a digitized 360 degree image of their product, have given the viewer an ability to change the vehicle's color, interior, and options. The process to create such a product takes months to develop and is not portable. Used car sales in 2011 reached 39 million. Each of these vehicles is unique not only in color and options, but in paint quality, dents, rust, modifications, etc. Used auto dealers currently may photograph several views of a vehicle to put on their websites. That involves time to capture and reposition the vehicle to keep consistent lighting and exposure with more time needed to view, edit, and upload to a website. To attempt a 360 view of a subject or auto, by moving the camera around the object, may result in a missed angle of view and ignores the exposure issues. Photographing with the sun or light source behind the camera means at the 180 degree point, the camera would be shooting into that light source producing lens flare, low contrast, and poor exposure. The constantly changing background would also be a distraction and unintentionally involve individuals unwilling to be photographed.

The 360 degree view turntable ensures the same lighting and background by rotating the object. When using the 360 virtual reality feature, the images are equally spaced, making a smooth viewing of the object. A 360 virtual reality enhances the purchasing experience. The buyer does not have to be physically present to evaluate or compare items. The seller, by simply uploading the single interactive file on a website, makes it available to anyone with a computer, smart phone, tablet, or other web-based electronic media, plus the single file allows the viewer to rotate forward or backward, and zoom in or out for detailed information on the object. The dealer and customer would have available at their finger tip, several examples of vehicles perhaps from all across the country, with each being viewed in a single interactive image.

This device is a portable rectangular shaped turntable, with the ability to be moved to different locations by a trailer transport system. The turntable rotates objects of various sizes and weights. The rectangular turntable surface is 80 inches wide by 240 inches in length. The weight capacity is tested to 7500 pounds. The device rotates an object at varying speeds, one to three revolutions per minute. The object on the turntable may be simply rotating to attract attention, or to be captured digitally by video, or a series of multiple still images. The turntable also features a triggering system that may be connected to a digital capture device. In a single revolution of the object, multiple equal angles of view are taken. These images may be used individually or combined and animated into one interactive 360 degree virtual reality.

DETAILED DESCRIPTION

Figure 1:
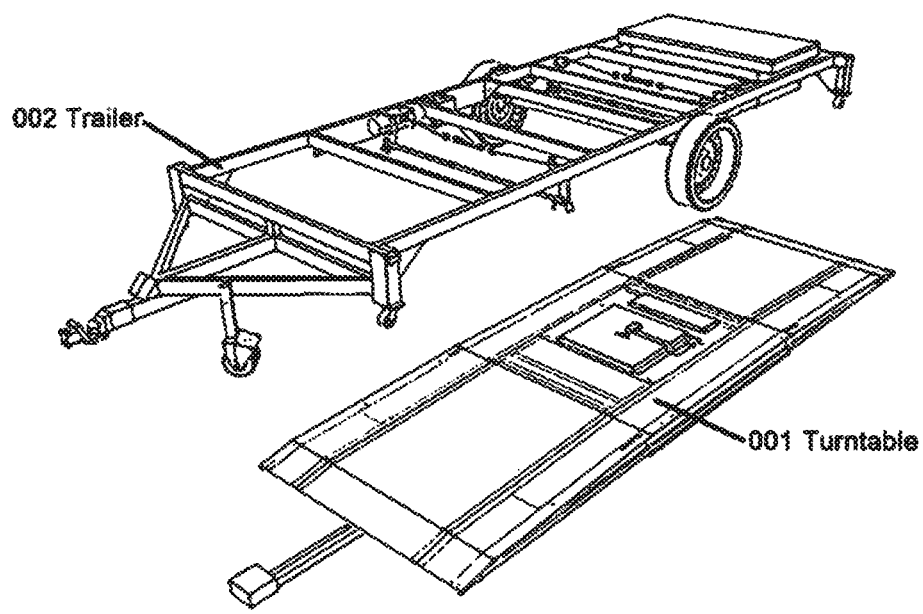
FIG. 1 shows an overall image of a custom trailer and turntable.

This utility device consists of a heavy duty (20'×80") custom built steel turntable 001 of FIG. 1 and a custom built transportation trailer 002. The turntable 001 is easily moved from location to location by raising it from the ground with winches 2201 of FIG. 17 built into the custom trailer 002. The winches 2201 draw the turntable 001 up to a cross member 2303 of FIG. 18, securing it in position on the underside of the trailer 002. When the trailer 002 and turntable 001 are positioned at the desired location, the winches 2201 are used to lower the turntable 001 to the flat surface. The trailer winches 2201 are disengaged from the turntable 001 and the trailer 002 is moved away, leaving the turntable 001 behind.

Figure 2:
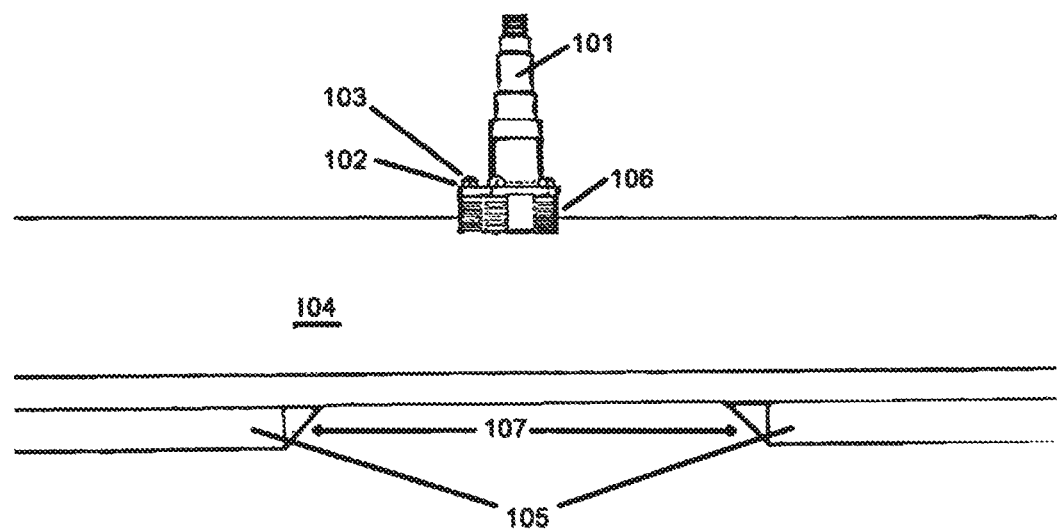
FIG. 2 shows a base with a center pivot and mounting.
Figure 9:
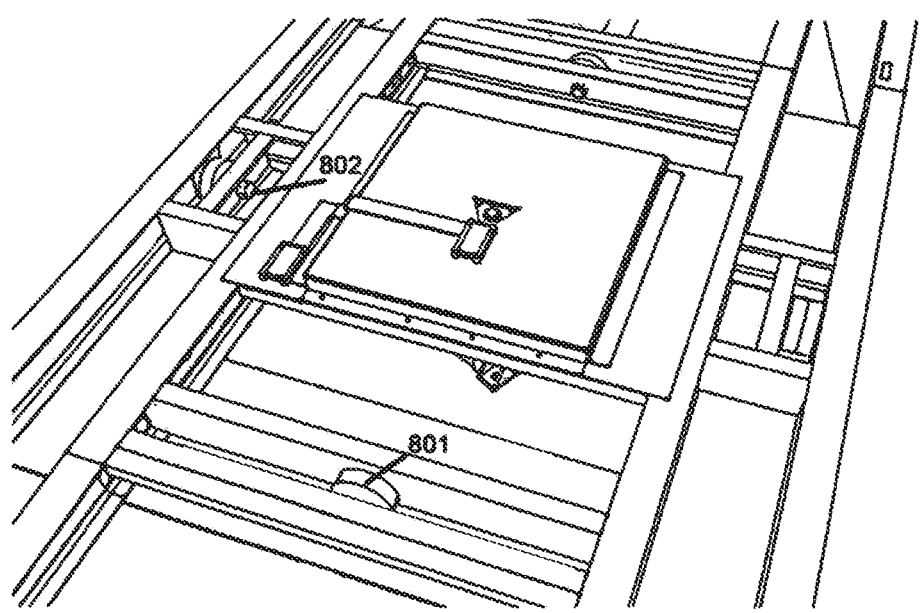
FIG. 9 shows steel casters location and mounting.
Figure 14:
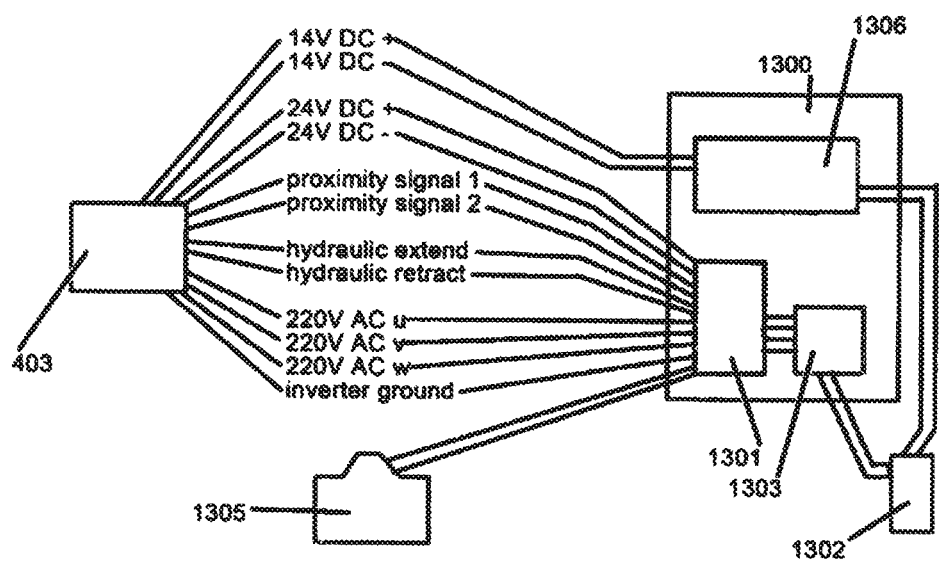
FIG. 14 shows an electrical control box and electrical diagram.

The turntable 001 of FIG. 1 rests on a base 104 of FIG. 2 which is an 80"×80" ¼" steel plate with a ⅜" high compression rubber 105 adhered to the underside. The base is needed to offer a smooth surface for the turntable casters 801 of FIG. 9 on which to ride. There are three purposes to the rubber 105: first, to protect the location's surface, secondly, to prevent creeping as the turntable 001 rotates, and finally to absorb slight irregularities such as small stones that may be present on the location's surface. An additional benefit to the rubber 105 is a four inch strip removed to create a channel 107 of FIG. 2 where wires run to feed power and send signals back and forth to a control box 1300 of FIG. 14. On the topside of the base 104, at its center, is a 3000# rated trailer axle 101 with a brake flange. It is mounted vertically to the base. The five ⅜" category eight rated bolts 102 are anchored to the base 104. Washers are used as shims 106 over the bolts 102 to adjust the axle 101 mounting height if needed and offer stability. Category eight nuts 103 are used to secure the axle 101 to the base 104.

Figure 3:
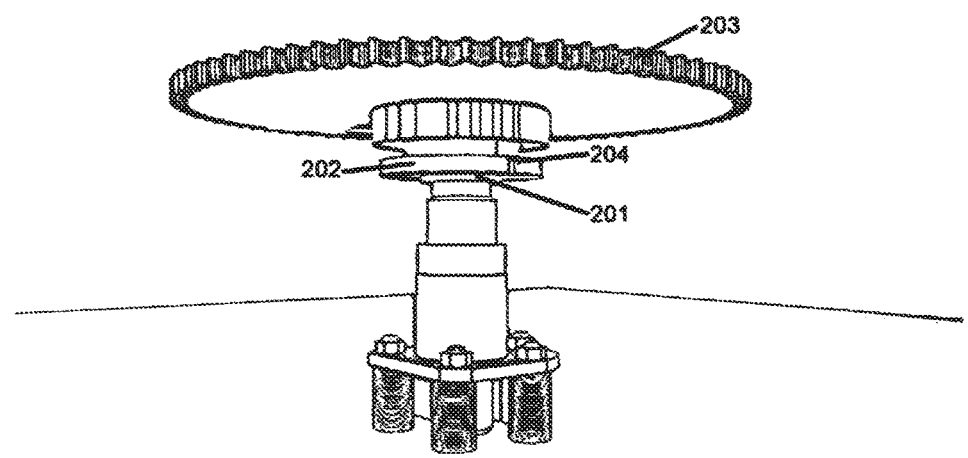
FIG. 3 shows a center pivot bushing, sleeve, and turntable drive gear.

Mounted on the 1.5" outer bearing surface of the axle 101, is a 1.75" OD bronze sleeve 201 of FIG. 3 with a flange edge. This sleeve 201 offers reduced friction to the SK quick mount bushing 202 that is placed over the sleeve 201. This bushing provides the mounting of a 72 tooth 14" sprocket 203. A shim 204 1/16" thick is placed in the compression slot of the SK bushing 202 to prevent its clamping too tight on the sleeve 201 when joining bushing 202 and sprocket 203.

Figure 4:
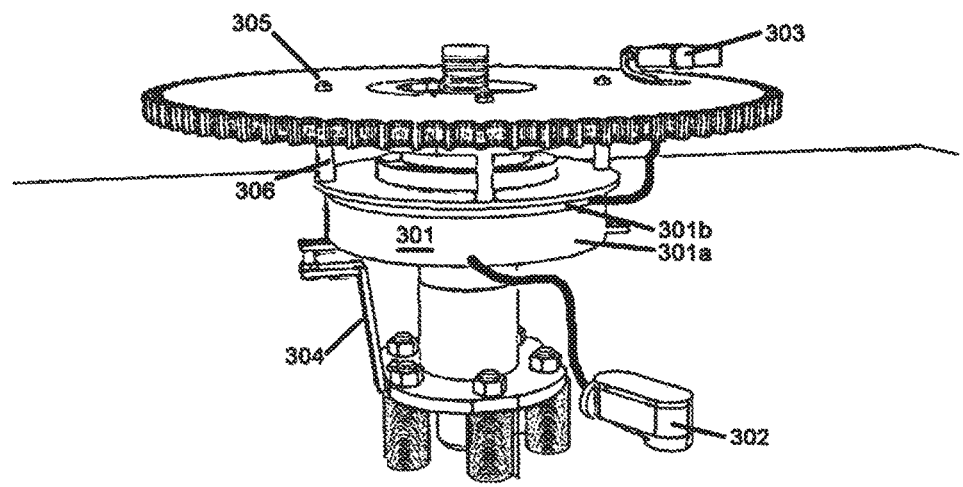
FIG. 4 shows a mounting and wiring of the power transferring slip ring.

Attached to the bottom of that sprocket 203 is the upper half of an electrical slip ring 301 of FIG. 4, and the bottom half of the ring 301 attaches to the base 104 of FIG. 2 by a bracket 304 of FIG. 4 mounted to the brake flange of axle 101. This ring 301 allows signals and 12V DC power to transfer from the stationary base 104 to the rotating turntable 001 of FIG. 1 without the use of cords. The power lines from the power chase 401 of FIG. 5 under the base 104 enter directly into a ¾" 90 degree service connector 302 of FIG. 4. This connector is modified with two holes to allow it to be mounted to the base 104 directly over the wires emerging from the underside of the base 104. The slip ring 301 stator side 301a lead wires join in that connector box 302 mounted to the base 104. The stator side 301a of the slip ring 301 is kept in stationary position with the bracket 304 mounted to the axle's flange 101. The rotator side 301b of the slip ring 301 is mounted to the underside of the 72 tooth sprocket 203 of FIG. 3 and its SK bushing 202 via four 2¾" #eight bolts 305. The bolts pass through two inch long ⅜" tubes 306 which are in between the sprocket 203 and slip ring 301 to prevent distortion of the slip ring 301 when tightening. Electrical power and signals are transferred to the revolving turntable 001 through a ⅜" opening drilled in the 72 tooth sprocket 203. A harsh environment DC connector 303 is utilized for protection from the elements and to facilitate the ease of removal of the large sprocket 203 if service is needed.

The power and signals are delivered to the center of the base 104 of FIG. 2 as previously described, by a channel 107 cut in the ⅜" rubber 105 adhered to the base 104. A ¼" wire chase or tunnel is created by two ¼" flat steel one inch bars mounted on the edge of three sides of a four inch wide flat ⅛" steel plate 401 of FIG. 5. That ⅛" steel plate 401 runs from the center to the leading edge of the 80"×80" base 104. From that point, a ⅛" steel "T" 408 extends eight feet to an eight by eight inch electrical connection box 403. Maintaining a chase for the wires from the base 104 is accomplished by adding on top of the fore mentioned ⅛" "T" 408, a six inch wide, ½" tall door sill plate 402 with open channels on its underside. The eight by eight inch electrical box 403 has a recessed 220V four pin plug 404 and a 12 conductor male multipin connector 405 mounted to the side of the box 403. Wiring enters the chase through a horizontal slot cut into the base of the eight by eight inch box 403

Figure 6:
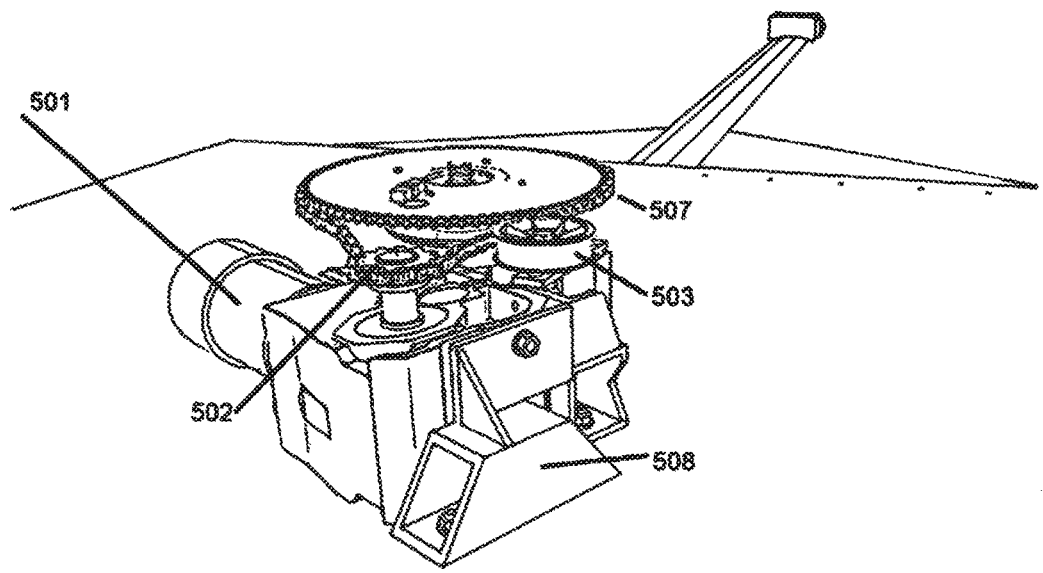
FIG. 6 shows a drive motor and gearbox with drive chain and tensioner.

Back at the center of the base 104 of FIG. 2, the drive system for the turntable 001 of FIG. 1 is provided by a 1 hp, 220V AC helical drive 501 of FIG. 6. A chain tensioner 503 is mounted on top of the channel steel mounting brackets 508 for the drive 501. The helical drive system 501 has an internal gear speed reduction of 97:1 and produces on the output shaft, an 18.5 rpm speed, down from the normal 1800 rpm motor output. A 12 tooth sprocket 502 on the drive's 501 output shaft transfers power to the 72 tooth sprocket 203 of FIG. 6 via a #50 roller chain 507 of FIG. 6 yielding an additional 6.0 reduction. This puts the turntable 001 rotating speed at three rpm. Covered later is an AC inverter 301 of FIG. 14 that paired with the helical drive 501 allows a variable speed from the normal three rpm down to one rpm.

Figure 7:
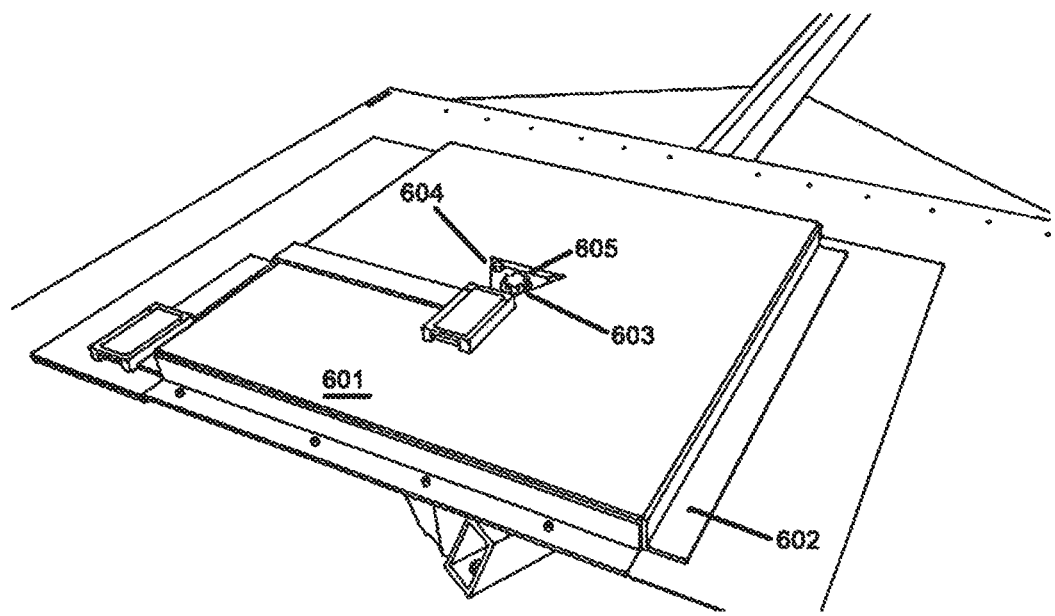
FIG. 7 shows a drive cover and electrical couplings.

The cover lid 601 of FIG. 7 is comprised of a ¼" steel plate and two by two inch angle irons 602. It has a recessed triangular mounting flange. The three category five bolts 604 mount through this recessed flange, directly to the large 72 tooth sprocket 203 of FIG. 3, thereby transferring rotating power to the turntable 001 of FIG. 1. The one inch threaded end of the axle 101 of FIG. 2 extends through the turntable cover lid 601 and is secured with a slotted lock nut 605 over a graphite plugged bronze washer 603 used to reduce friction. This lock nut 605 holds the base 104 to the turntable 001 while it is lifted for transport.

Figure 8:
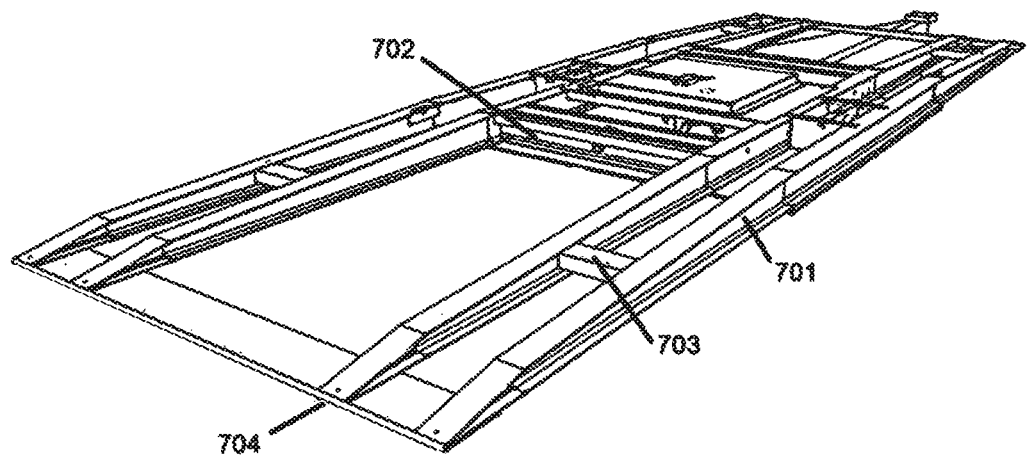
FIG. 8 shows turntable main frame members.

The backbone of the turntable 001 of FIG. 1 is built around four "H" beams (5.9" web height 701a and 4" flange width 701b) 701 of FIG. 8. These 20' long beams have a three inch taper cut into the first segment of the beam, starting at 50" in from each end, progressing to 12" from the end. The last 12" has a taper from the remaining three inches down to ¾". A ¾" pipe 704 is split in half and welded to the front and back leading edge of the turntable. A ¼" steel plate 705 12" wide is welded laterally to the bottom side of the angled 12" leading edge of the four modified "H" beams. The cross members are "C" channel, six inch 702 four inch 703. The four inch channels 703 are welded channel down to accept the hydraulic cylinders 901 of FIG. 10.

The turntable cover lid 601 of FIG. 7 is attached to the frame of the turntable. The turntable revolves on the 80"×80" base 104 of FIG. 2 via the four casters 801 of FIG. 9 mounted to the frame by one inch bolts 802, washer, a slotted locknut, and cotter pin. They are rated at 6000#, with roller bearings and protrude ⅝" beyond the underside of the turntable 001 of FIG. 1 frame. The casters ride on the outer perimeter of the base 104, in a 70" diameter circle with the axle 101 as center.

Figure 10:
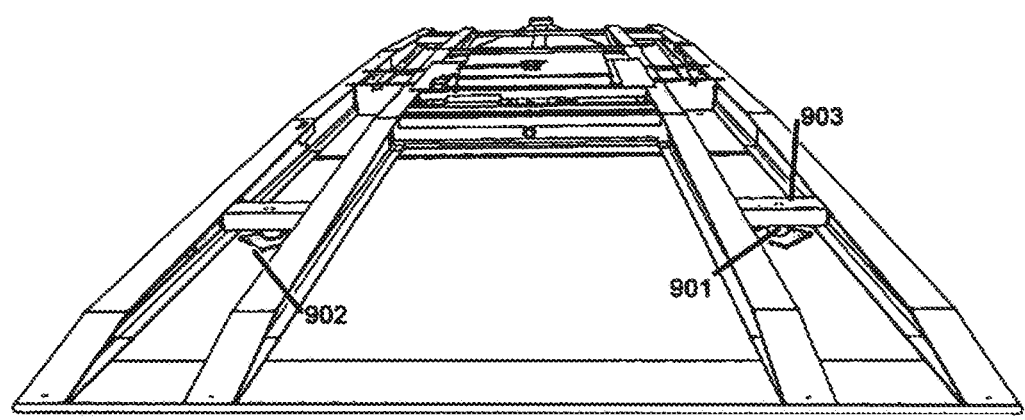
FIG. 10 shows stabilizing hydraulic cylinders and mounting.

Hydraulic cylinders 901 of FIG. 10 are mounted to the underside of the four inch "C" channels 703 of FIG. 8 which are mounted with channel facing down and anchored by two bolts 903. These cylinders 901 extend one inch under pressurization, to contact the ground whenever the turntable 001 of FIG. 1 is not revolving. Their purpose is to offer stability and stress relief when loading and unloading the vehicle. The hydraulic cylinders 901 have five by five inch ¼ steel plates 902 mounted to the end of the cylinder to prevent damage to the location surface.

Figure 11:
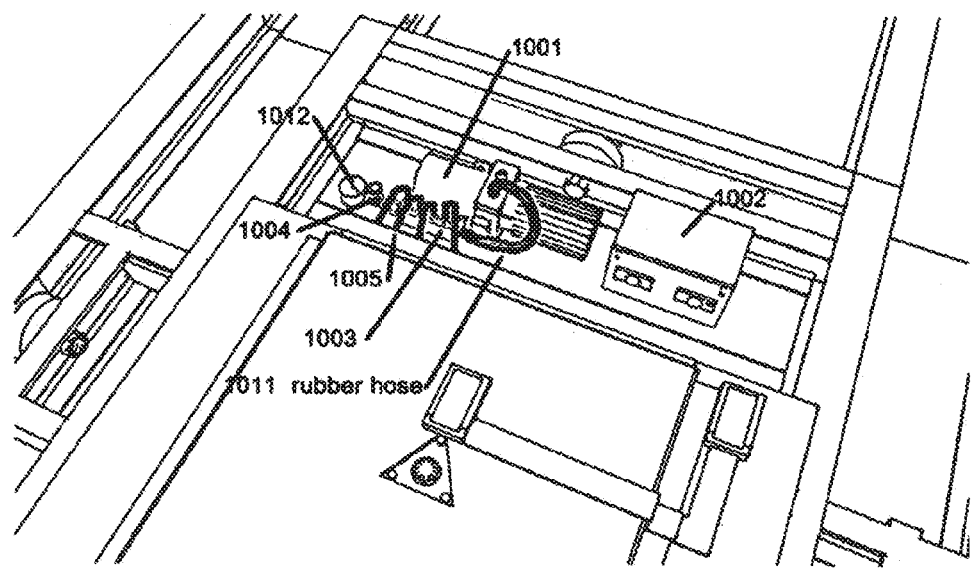
FIG. 11 shows a hydraulic pump, manifold, and pressure switch location.

The cylinders 901 of FIG. 10 are pressurized by a hydraulic pump 1001 of FIG. 11 producing 4000 psi. It receives power from a sealed lead acid 12V deep cycle battery 1002. This type of battery 1002 is used to allow it to be mounted on its side and thereby fit in the low profile of this turntable 001 of FIG. 1. A pressure switch 1004 of FIG. 11 role in the system is to release or hold the hydraulic pressure at 3500 psi. The pressure switch 1004 may command an extend or retract position for the cylinders 901. The switch receives its signals through the slip ring 301 of FIG. 4. The battery 1002 retains its charge by a 14V DC current also delivered through the slip ring 301. The two electrical covers 1106 have flip up doors to access the connectors 303 of FIG. 4. The removal of the drive cover 601 of FIG. 7 necessitates the uncoupling of the connectors 303. The four hydraulic cylinders 901 receive equal pressure via a six-port manifold 1003. Four ports are used for the cylinders 901, one port for the pressure switch 1004 and gauge 1012, plus one port for the supply. The supply pressure is provided through a ½", rubber hydraulic hose 1011, while the cylinders 901 receive their pressure via a ⅜" aluminum composite line 1005 rated at 4700 psi.

Figure 12:
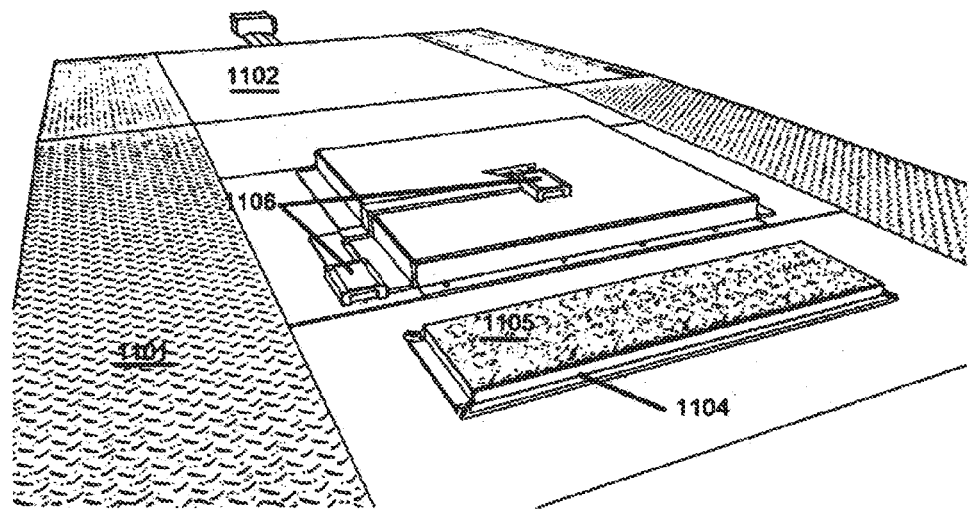
FIG. 12 shows deck covering and access covers.
Figure 13:
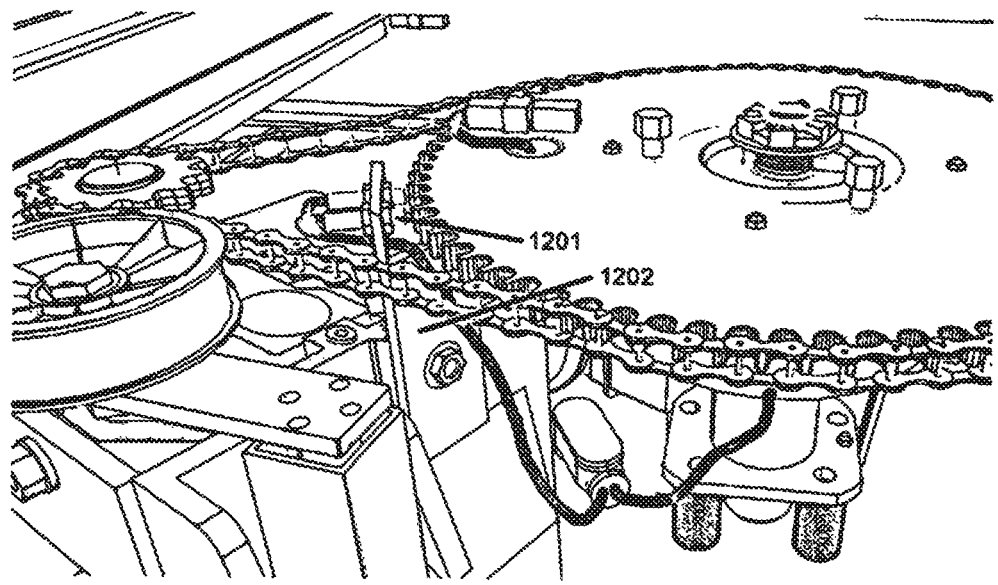
FIG. 13 shows proximity switches and mounting.

The two outer "H" beams 701 of FIG. 8 are covered in an 18" wide diamond plate 1101 of FIG. 12 for traction with smooth steel 1102 filling in the center. The cover for the hydraulics is comprised of a frame made from one by one inch angle iron 1104 and a ⅛" steel cover 1105. The lid is secured with four studs and wing nuts making it easily accessible. For the system to know when to rotate, raise or lower the hydraulic cylinders 901 of FIG. 10, two proximity switches 1201 of FIG. 13 are installed on a bracket 1202 secured to the drive 508 of FIG. 6 mount. They are positioned to read, but not contact the lobes of the 72 tooth sprocket 203 of FIG. 3, giving position, rotation direction, speed, and when a digital camera is connected, triggers the camera at equally divided integral number of photos in a 360 degree revolution.

Figure 5:
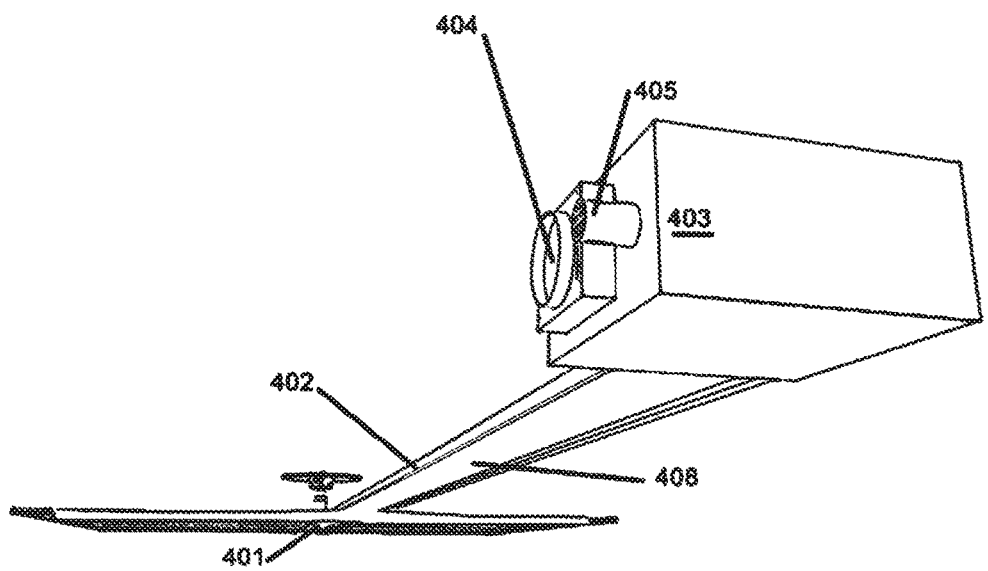
FIG. 5 shows an underside of the base plate with power chase and connections.

The signals from the proximity switches 1201 follow the electrical chase 401 of FIG. 5 traveling under the base 104 of FIG. 2 to the electrical enclosure 403. The wires are connected to the male 12 pin multi connector 405 of FIG. 5. Also connected on this multi pin connector 405 are hydraulic extend and retract commands, 24V DC power for proximity switches, and 14V DC supplied by a battery charger 1306. The 220V AC 404 and multi-pin cable connectors 405 and on the side of the electrical enclosure 403 connect to the control box 1300 of FIG. 14. Housed in this box is the AC inverter 1301 and a transformer 1303. The inverter 1301 is powered by a portable generator or extension cord from the nearest power source. The 120V AC power 1302 is run through the transformer 1303 in reverse, bumping the voltage up to 220V AC. This voltage is needed for the inverter 1301 and helical drive 501 of FIG. 6. The inverter 1301 is custom programmed through the inverter software to receive the signals from the proximity switches 1201 of FIG. 13 and send out signals to the cylinders 901 of FIG. 10 and a still digital camera if connected. The inverter 1301 also controls the speed of the helical drive 501 by varying the voltage and frequency. Engaging the start button on the inverter 1301, the cylinders 901 receive the signal to retract, the helical drive 501 exercises a slow acceleration to selected speed. If a camera 1305 is connected, it will receive a trigger signal at every selected degree of rotation as commanded by the operator. The accuracy of the timing is provided by the proximity switches 1201 reading the lobes of the sprocket 203 of FIG. 3. As the turntable approaches the completion of a 360 degree revolution, the inverter 1301 sends a gradual deceleration signal to the helical drive 501. At completion of the full revolution, the cylinders 901 receive an extend signal to provide stability and stress relief for unloading and loading next vehicle.

Figure 15:
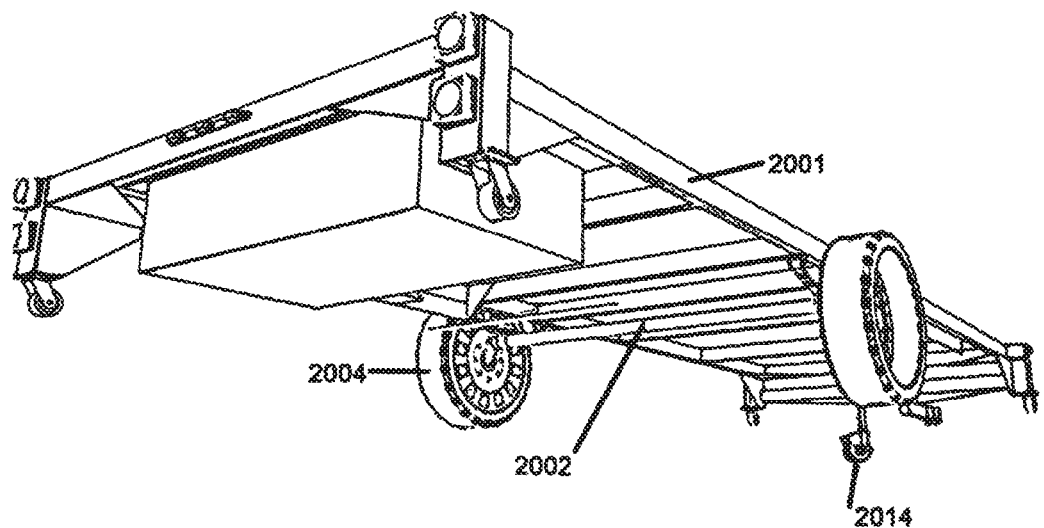
FIG. 15 shows trainer construction material and methods.

The main frame of the trailer 002 of FIG. 1 is made of two by four inch tube steel 2001 of FIG. 15. Wires are run through the inside of the tube 2001 to the brakes, side marker lights as well as the brake and turn signals. A 7000# four inch drop axle 2002 is mounted upside down to gain the maximum ground clearance. In addition, the springs are mounted on the top of the axle versus the normal under the axle mounting. Two 31.6" diameter tires 2004 are used for additional clearance. A travel jack 2014 with two wheels and a brake, uses a hand crank drive system allowing the trailer to be critically positioned, aligning the trailer 002 over the hoisting points of the turntable 001.

Figure 16:
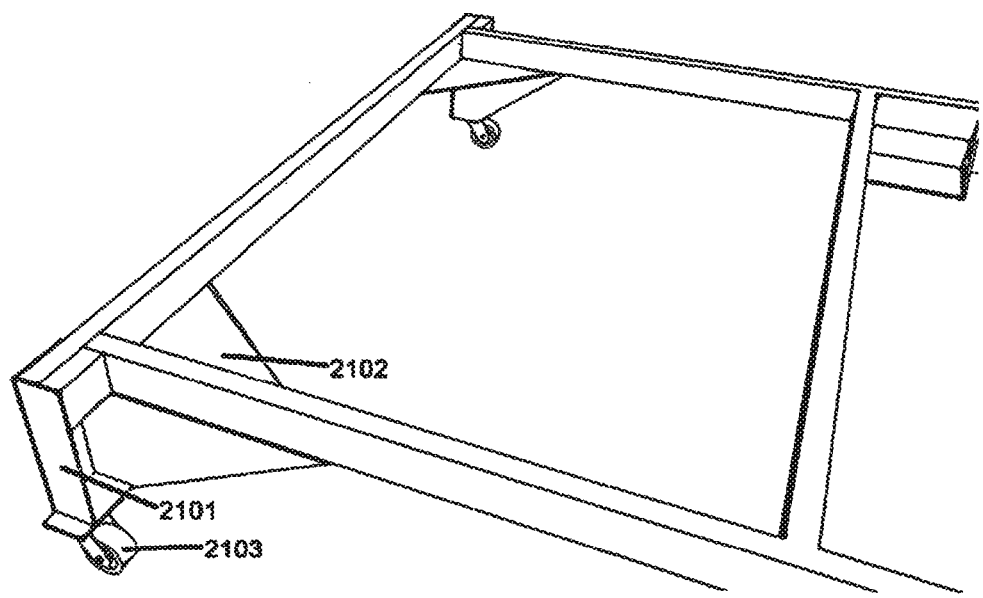
FIG. 16 shows curb protector construction and location.

Because the turntable 001 of FIG. 1 hangs beneath the trailer 002 during transportation and its leading edges are only ¾" in height, therefore all four corners of the trailer 002 feature descending towers, which serve as curb protectors, FIG. 16, to protect the turntable and the road surface. The curb protectors are constructed of ¼" steel 2101 and reinforced with ¼" steel triangles 2102. Four inch steel casters 2103 rated at 1000# each are mounted to the lowest point of each of the curb protectors. These do not contact the ground except in the rare situation of steep incline, curb, or dip in the road surface. They contact the inclined surface and guide the trailer 002 and turntable 001 past the irregularity of the road surface.

Figure 17:
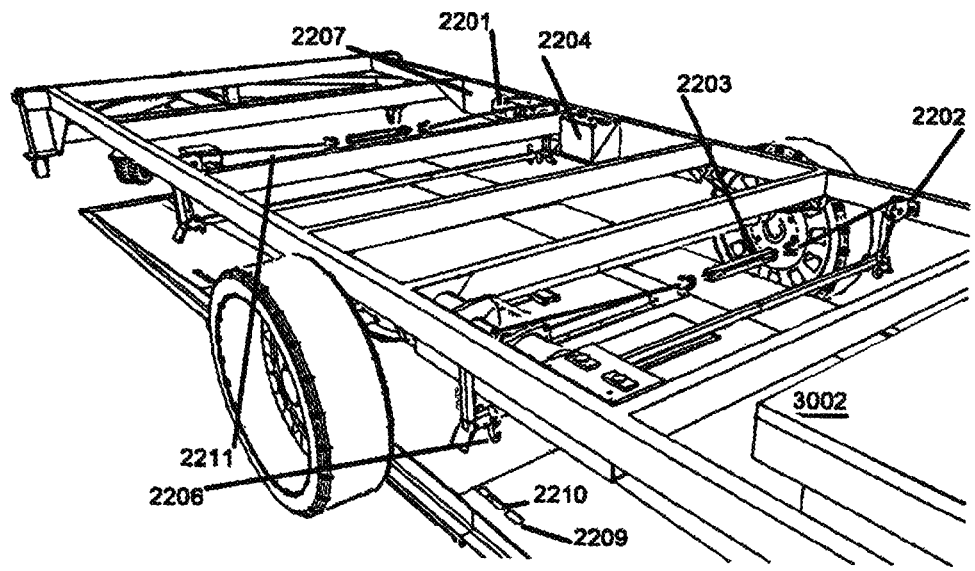
FIG. 17 shows a winching system to lift the turntable to the trainer underside.

Two 12,000# winches 2201 of FIG. 17 are mounted on the reinforcing plate 2207. There are two ⅜" wire ropes 2211 wrapped separately on each winch 2201. A pulley 2202 is used on the frame 2001 of FIG. 15 on the side opposite of each winch 2201 to allow equal lift. A slip hook 2206 is attached to the one inch rod 2210 welded to the turntable frame members 701 & 702 of FIG. 8. The rod 2210 is accessed through the slot 2209 cut in the diamond plate deck 1101 of FIG. 12 and the top flange of the "H" beam 701. A turnbuckle 2203 is used to calibrate the two wire ropes 2211 to make the turntable 001 contact equally the cross member 2303 of FIG. 18 of the securing system. All extra cable is removed to only allow five wraps of wire rope 2211 on the winch 2201 bar. The purpose is to get the maximum lift power and a reduction in cable speed. The winches 2201 are powered each by their own 12V battery 2205. These batteries 2205 are wired together in the wiring harness 2008 of FIG. 15 so that during transportation, the batteries will charge through the seven pin wiring harness 2008 of the tow vehicle.

Figure 18:
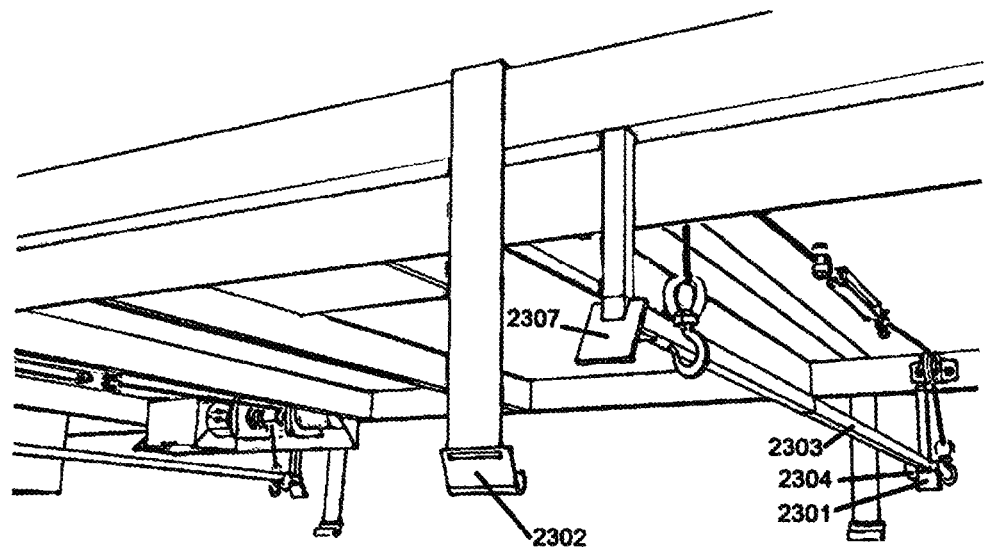
FIG. 18 shows securing the raised turntable for transport.

Part of the trailer underside is a centering and transport cross member 2303 of FIG. 18. As the turntable 001 of FIG. 1 is lifted toward the cross member 2303, the 45 degree angled plates 2307 which are covered with a nylon surface 2301, center the turntable 001 of FIG. 1 laterally while the angled blades 2304 center it lineally. The blades 2304 insert into the slots 2209 on the turntable 001 to prevent movement back and forth. The turntable 001 rests against the rubber pads on the underside of the cross member 2303. This securing system is needed because the wire rope 2211 alone would not prevent the turntable 001 from swinging side to side or front to back in transport. Two safety cargo straps 2302 rated at 3500# are clipped into the four slots at the corners of the base 101 and are secured over the top of the trailer frame 2001 of FIG. 15. These straps 2302 are used for safety purposes during transportation but are also necessary to remove stress on the single one inch slotted nut 605 of FIG. 7 on the pivot axle 101 of FIG. 2 that is carrying the load of the base and drive.

A cargo bin 3002 of FIG. 17 is mounted on the back of the trailer 002 of FIG. 1 to house items needed and offer counter balance to reduce the tongue weight on the hitch, making the trailer 002 more maneuverable when travel jack 2014 of FIG. 15 is operated by hand.

The construction is all steel with several electronic components. These parts are commercially available and if modified, it is explained in the narrative with the drawings. Patents exist for built-in garage turntables that rotate autos to eliminate the need to back out garages. Small turntables exist, in order to display small objects. This device takes the portability of the small turntable along with the size of the non-portable built-in, and thus a new concept in the marketing of large objects. The highly portable, fast set-up turntable is capable of rotating up to 7500 pounds at varying speed.

The turntable has a custom built trailer to transport the turntable from location to location. The turntable is carried on the underside of the trailer, secured at four points by wire rope and two winches. Two cargo safety straps hook into a slot, one from each of the corners of one side of the turntable base, pass over the trailer frame to hook into the slots of the opposite corners of the base. The total weight of the complete system is under 5000 pounds and is able to be towed by a SUV, van, or truck. Upon arrival at the selected site, the safety cargo straps used in transportation are removed. The two winches lower the turntable with a base attached. The base provides a smooth surface for the casters of the turntable on which to roll and removes imperfections of the location surface.

The hooks of the winches are undone and the trailer is driven off, leaving the turntable behind. A control box which is carried separately in the tow vehicle, has electronic components such as a battery charger, transformer, and an AC inverter. These quickly connect, with the use of a 12 pin multi-connector and a 220V extension cord, to the connector box attached to the base of the turntable. The control box receives its power from a portable generator or a 120V power source nearby.

The AC inverter powers the turntable and in its first rotation, receives signals from proximity switches mounted near the drive sprocket. These switches communicate position, direction, and speed by reading the lobes of the chain driven sprocket. The signals are processed in the programmable logic controller of the AC inverter. An algorithm communicates commands for the hydraulic cylinders located at the four corners of the turntable, to extend or retract. The hydraulic cylinders extend to contact the ground offering stability and provides stress relief of the turntable when stopped. The AC inverter's algorithm may also be used to send a trigger signal to a digital camera. This would yield multiple images, each of an equal differential of viewing angle. An image taken every 5 degrees, as an example, totals 72 images in a 360 degree revolution. These images may be used individually or combined and animated into one interactive 360 degree virtual reality.

The profile of the turntable is based on a modified "H" beam that has a sloped entry and exit. This allows a vehicle, in example, to drive directly onto the turntable, be spun, and then driven off. Using the auto as an example, numerous vehicles may be ready in cue, being prepped, and measured in length. If a 360 virtual reality animation is being performed, the following procedure is recommended to prevent a visual wobble of the auto. The length of the vehicle is divided in half, and a measuring scale on the turntable surface provides the stop position. If the vehicle is 16 feet long, the vehicle is driven to the eight foot mark from the turntable's center pivot.

The images are stored in a computer, where the subject is assigned a name, number, or other pertinent information. The multiple images, if a 360 degree animation is being performed, are combined into one interactive file. This file on any computer, smart phone, or web-based media, allows the viewer the ability to rotate forward or backward and zoom in or out for detailed information.

To move to another location, the power connections from the control box are removed and the trailer is repositioned above the turntable. The winch hooks are reconnected and lift the turntable to a transport cross member. That cross member has angled plates on its ends to center the turntable laterally and blades extending below the member to secure lineally the turntable. The cargo safety straps are reattached to the base and over the trailer frame to secure for transport.

The invention claimed is:

1. A combination trailer and turntable, comprising:
   a frame with a hitch at an end thereof configured to be attached to a vehicle, the frame including an underside;
   at least one pair of spaced wheels rotatably disposed on the frame;
   a lifting system attached to the frame;
   a turntable assembly sized and shaped to be removably secured underneath the frame and configured to be removably attached to the lifting system to be raised and lowered relative to the frame;
   the turntable assembly including a base configured to supportingly engage a ground surface when the turntable assembly is lowered and separated from the frame;
   a pivot disposed on the base;
   a turntable rotatably disposed on the pivot, the turntable being sized and shaped to receive at least a motor vehicle thereon when the turntable assembly is separated from the frame and resting on the ground surface; and
   a drive system configured to selectively rotate the turntable relative to the base about the pivot, wherein the frame includes cradles configured to receive, align and retain the turntable assembly under the frame.

2. The trailer and turntable of claim 1, wherein the cradles are angled members that are positioned and shaped to guide the turntable assembly into position on the underside of the frame.

3. The trailer and turntable of claim 2, wherein the angled members are configured to center the turntable assembly laterally and axially relative to the frame.

4. The trailer and turntable of claim 1, further comprising an inverted drop axle attached to an underside of the frame, wherein the at least one pair of spaced wheels are disposed on the inverted drop axle.

5. The trailer and turntable of claim 4, wherein the inverted drop axle is a single, four-inch drop axle.

6. The trailer and turntable of claim 1, wherein the lifting system includes a winch mechanism.

7. The trailer and turntable of claim 6, wherein the winch system is an electrical winch system.

8. The trailer and turntable of claim 7, wherein the winch system includes a plurality of hooks shaped and sized to releasably engage the turntable assembly.

9. The trailer and turntable of claim 1, wherein the pivot is disposed substantially centrally on the base.

10. The trailer and turntable of claim 1, including a plurality of turntable casters rotatably disposed on the base and positioned about the pivot in engagement with the turntable to support the turntable during rotation thereof.

11. The trailer and turntable of claim 10, including four turntable casters.

12. The trailer and turntable of claim 1, wherein the drive system includes a helical drive.

13. The trailer and turntable of claim 1, wherein the drive system includes a gear box with a gear reduction that is configured to cause the turntable to rotate relative to the base at a rate between one to three revolutions per minute (RPM).

14. The trailer and turntable of claim 1, wherein the drive system includes an electric drive motor mounted to the base, the drive motor operatively connected to a gearbox operatively connected to the turntable.

15. The trailer and turntable of claim 1, wherein the turntable includes a ramp on one end thereof to facilitate loading and unloading of a wheeled vehicle onto or from the turntable.

16. The trailer and turntable of claim 1, wherein the turntable assembly is secured to an underside of the frame at four points.

17. A combination trailer and turntable, comprising:
   a frame with a hitch at an end thereof configured to be attached to a vehicle, the frame including an underside;
   at least one pair of spaced wheels rotatably disposed on the frame;
   a lifting system attached to the frame;
   a turntable assembly sized and shaped to be removably secured underneath the frame and configured to be removably attached to the lifting system to be raised and lowered relative to the frame;
   the turntable assembly including a base configured to supportingly engage a ground surface when the turntable assembly is lowered and separated from the frame;
   a pivot disposed on the base;
   a turntable rotatably disposed on the pivot, the turntable being sized and shaped to receive at least a motor vehicle thereon when the turntable assembly is separated from the frame and resting on the ground surface; and
   a drive system configured to selectively rotate the turntable relative to the base about the pivot,
   wherein the base includes a plurality of hydraulic cylinders configured to engage the ground surface to orient and stabilize the turntable assembly.

18. The trailer and turntable of claim 17, wherein the base has a generally rectangular shape that includes four corners, and wherein each of the plurality of hydraulic cylinders is disposed at a respective one of the four corners of the base.

19. The trailer and turntable of claim 17, further including a hydraulic pump disposed on the base, a source of electrical power that is operably associated with and operates the hydraulic pump, and a manifold fluidly connected to the hydraulic pump and the plurality of hydraulic cylinders to distribute hydraulic fluid among the plurality of hydraulic cylinders from the hydraulic pump.

* * * * *